(12) United States Patent
Fujino et al.

(10) Patent No.: US 8,740,630 B2
(45) Date of Patent: Jun. 3, 2014

(54) LOGO CONNECTOR

(75) Inventors: Takane Fujino, Kanagawa-Ken (JP); Kenshin Yonemochi, Kanagawa-Ken (JP); Norihiro Andoh, Tokyo (JP); Yasuhiro Kobayashi, Kanagawa-Ken (JP)

(73) Assignee: Lenovo (Singapore) Pte. Ltd., Singapore (SG)

( * ) Notice: Subject to any disclaimer, the term of this patent is extended or adjusted under 35 U.S.C. 154(b) by 142 days.

(21) Appl. No.: 13/356,414

(22) Filed: Jan. 23, 2012

(65) Prior Publication Data

US 2013/0189857 A1 Jul. 25, 2013

(51) Int. Cl.
*H01R 12/00* (2006.01)

(52) U.S. Cl.
USPC ............................................. 439/76.1; 439/67

(58) Field of Classification Search
USPC .......................................... 439/67, 76.1, 700
See application file for complete search history.

(56) References Cited

U.S. PATENT DOCUMENTS

| | | | | |
|---|---|---|---|---|
| 5,447,442 A | * | 9/1995 | Swart | 439/77 |
| 5,459,637 A | * | 10/1995 | Ma et al. | 361/679.41 |
| 6,227,872 B1 | * | 5/2001 | Stephenson et al. | 439/76.1 |
| 6,878,016 B2 | * | 4/2005 | Wulff et al. | 439/700 |
| 7,160,119 B2 | * | 1/2007 | Rathburn | 439/77 |
| 8,234,509 B2 | * | 7/2012 | Gioscia et al. | 713/300 |
| 2010/0330825 A1 | | 12/2010 | Fan | |
| 2012/0044624 A1 | * | 2/2012 | Hoffman et al. | 361/679.21 |

FOREIGN PATENT DOCUMENTS

JP 2005-174901 7/1993

* cited by examiner

*Primary Examiner* — Hien Vu

(74) *Attorney, Agent, or Firm* — Shimokaji & Associates, P.C.

(57) ABSTRACT

An electronic device with a connector system is provided to give a user an improved appearance, functionality, and aesthetics. A connector system may comprise a housing, a circuit board mounted within the housing, and a plurality of externally accessible connectors. The housing may have a front side and a back side. The plurality of externally accessible connectors may be mounted directly on the circuit board within the housing, so that the plurality externally accessible connectors may extend substantially perpendicular from the plane of the circuit board and face the back side of the housing. The plurality of externally accessible connectors may comprise substantially flat metal plate.

14 Claims, 3 Drawing Sheets

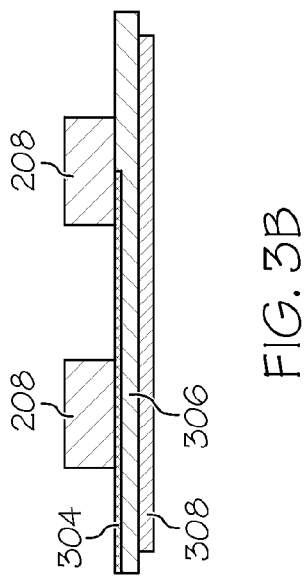
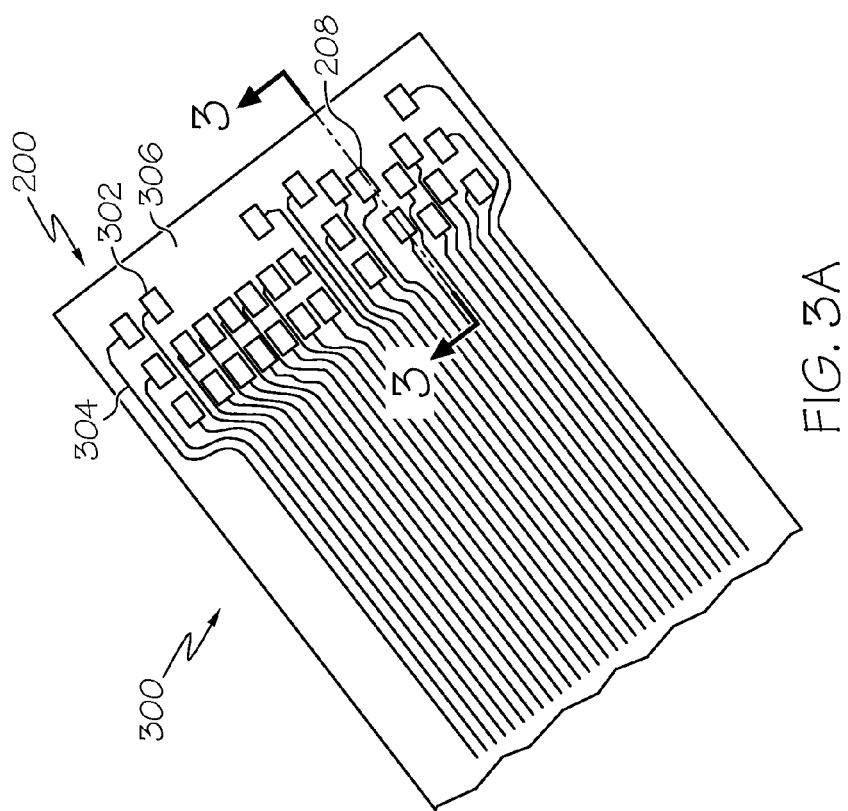

LOGO CONNECTOR

BACKGROUND OF THE INVENTION

The present invention relates generally to computer systems and, more specifically, to tablet computers having logos which operate as connecting terminals.

In the world of consumer electronic devices, there has been an ever-present demand for improved appearance, improved functionality, and improved aesthetics. Industrial design has become a highly skilled profession that focuses on fulfilling this need for enhanced consumer product appearance, functionality, and aesthetics.

Much of the aesthetic appeal of an electronic device or other consumer product may quickly be compromised if there are too many display elements, such as logos, lights, and indicators, for example, or if too much of the visible display area is occupied by display elements that are not needed or relevant at all times. When not needed, these "passive" or inactivated display elements, such as logos, may remain perceptible to the user, without other functionalities.

Therefore, it can be seen that there is a need for a tablet computer with logos that are both aesthetic pleasing and functional.

SUMMARY

In one aspect, a connector system comprises a housing having a front side and a back side; a circuit hoard mounted within the housing; and a plurality of externally accessible connectors mounted on the circuit board within the housing, so that the plurality of externally accessible connectors extend from the plane of the circuit board and faces the back side of the housing, wherein the plurality of externally accessible connectors are arranged into at least one pattern, wherein the plurality of externally accessible connectors comprise a substantially flat metal plate.

In another aspect, an electronic computing device comprises a plurality of connectors disposed at an exterior surface of a housing of the electronic computing apparatus, the plurality of substantially flat connectors including at least a first set of connectors disposed at a first place of the external surface of the housing, and a second set of connectors disposed at a second place away from the first place of the external surface of the housing, wherein the plurality of connectors are arranged into a product logo.

In a further aspect, a mobile computing device comprises a housing having a front side and a back side, wherein the front side is adapted to receive a display screen; and a plurality of externally accessible connectors mounted on the back side of the housing, wherein the plurality of externally accessible connectors are arranged into a plurality of patterns, wherein the plurality of patterns comprise logos, wherein the plurality of externally accessible connectors are adapted to conduct power.

These and other features, aspects and advantages of the present invention will become better understood with reference to the following drawings, description and claims.

BRIEF DESCRIPTION OF THE DRAWINGS

FIG. 3A is a schematic view of a flexible printed circuit board used for the tablet personal computer of FIG. 1 according to an exemplary embodiment; and FIG. 3B is a cross-sectional view of the flexible printed circuit board taken along line 3-3 of FIG. 3A according to an exemplary embodiment.

DETAILED DESCRIPTION OF EMBODIMENTS

The following detailed description is of the best currently contemplated modes of carrying out exemplary embodiments. The description is not to be taken in a limiting sense, but is made merely for the purpose of illustrating the general principles, since the scope of the embodiments is best defined by the appended claims.

Various inventive features are described below that can each be used independently of one another or in combination with other features.

Broadly, exemplary embodiments comprise an aesthetically pleasing visual display that may be used as terminal connectors. More specifically, exemplary embodiments of a tablet PC may provide visual displays, such as trademark logos, which are used as terminal connectors. According to exemplary embodiments, a plurality of externally accessible connectors may be arranged into a pattern at a back side of the tablet PC. The logo connectors of tablet PC may be used in conjunction with a cradle or docking station. By putting the tablet PC on the cradle, batteries may be charged and data communication links may be established.

Figure 1:
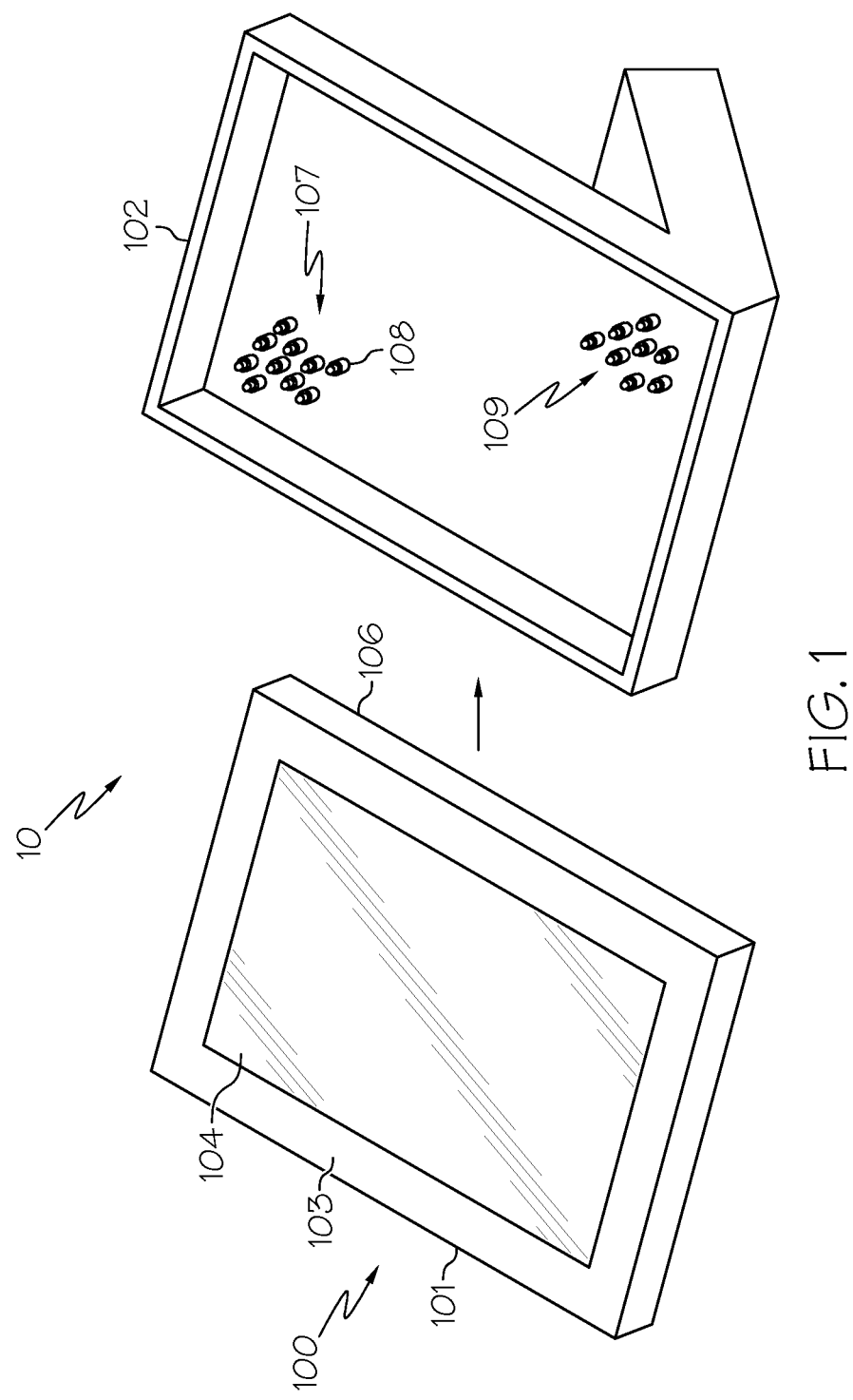
FIG. 1 is a perspective view of a tablet personal computer with a docking station according to an exemplary embodiment.

Referring to FIG. 1, an electronic apparatus 10 may include a tablet personal computer (PC) 100 and a cradle 102. The tablet PC 100 may be a computer system, such as one of the ThinkPad® series of personal computers sold by Lenovo (US) Inc. of Morrisville, N.C.

The tablet PC 100 may be, for example, a handheld computer, a server, a personal digital assistant, a cellular telephone, a network appliance, a camera, a smart phone, a network base station, a media player, a navigation device, an e-mail device, a game console, a television receiver (e.g., a satellite or cable television set-top box), a digital-video-recorder (DVR), an automatic teller machine (ATM), a security system (e.g., a door or gate access system), or a combination of any two or more of these data processing devices or other data processing devices. In other words, the device 100 may comprise any type of electronic device, general purpose computing device or special purpose computing device that includes a processor and other circuitry or logic operable to perform the pictorial authentication process described herein to control access to a secured item.

In some embodiments, the tablet PC 100 may include a housing 101. The housing 101 may include a front side 103 and a back side 106. The front side 103 may be adapted to receive a display screen, such as a touch sensitive screen 104, for example. The tablet PC 100 may comprise other elements, parts or components not illustrated for the sake of brevity. The touch sensitive screen 104 may be implemented with liquid crystal display (LCD) technology, light emitting polymer display (LPD) technology, or some other display technology. The touch screen 104 may be sensitive to haptic and/or tactile contact with a user.

Figure 2B:
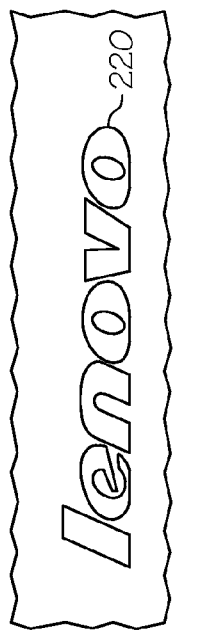
FIG. 2B is an enlarged front view of a logo of the tablet personal computer of FIG. 2A according to an exemplary embodiment.

The cradle 102 may include a plurality of power supply line connecting terminals 107 and data communicating terminals 109. The terminals 107, 109 may comprise a plurality of protruding pins 108. The plurality of protruding pins 108 may be disposed to be situated to correspond to connectors, such as logo connectors 202 and 206 (as shown in FIG. 2A) of the tablet PC 100. The protruding pins 108 may be biased by elastic members, such as springs (not shown). The tablet PC 100 may use the cradle 102, for example, to charge the batteries of the tablet PC 100. Data communication may also be established between the tablet PC 100 and the cradle 102.

Referring to FIG. 2A, a first logo connector 202 may be disposed at a first place of the back side 106 of the housing 101 of the tablet PC 100. A second logo connector 206 may be disposed at a second place which may be different from the first place. The shape of the first logo connector 202 may be a trademark, such as ThinkPad™ as shown in FIG. 2C. The shape of the second logo connector 206 may be a different trademark, such as Lenovo™ as shown in FIG. 2B.

Figure 2D:
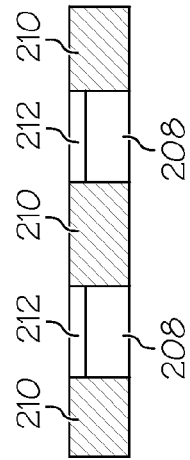
FIG. 2D is a cross-sectional view of the logo of the tablet personal computer taken along line 2-2 of FIG. 2C according to an exemplary embodiment.
Figure 2A:
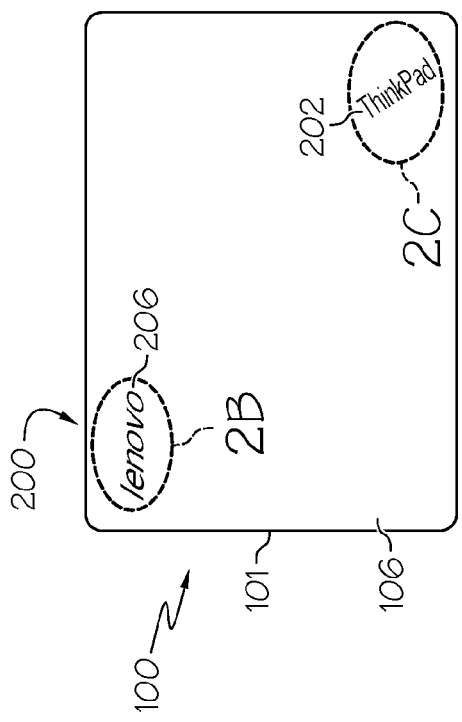
FIG. 2A is a front view of a back side of a tablet personal computer of FIG. 1.
Figure 2C:
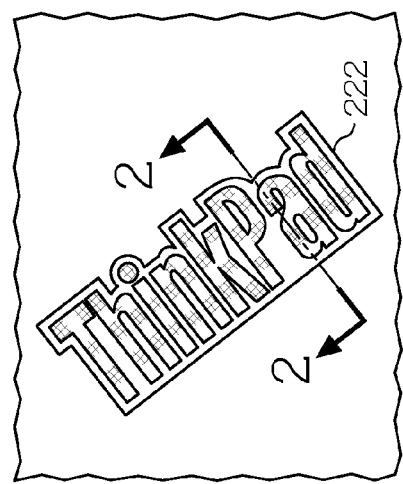
FIG. 2C is an enlarged front view of another logo of the tablet personal computer of FIG. 2A according to an exemplary embodiment.

Referring to FIG. 2D, a connector system 200 may include the housing 101 and a plurality of externally accessible connectors 208. The plurality of externally accessible connectors 208 may be substantially flat and may be separated by insulated materials, such as insulated plastics 210, forming a plurality of channels 212, for example, as shown in FIG. 2D. The channels 212 may be configured to receive the protruding pins 108 of the cradle 102. Thus, the protruding pins 108 may fit into the channels 212 and contact the externally accessible connectors 208.

As shown in FIG. 3A, the connector system 200 may further include a circuit board 306, such as flexible printed circuit board (FPC). The plurality of externally accessible connectors 208 may be mounted directly on the circuit board 306 within the housing 101 so that the plurality of externally accessible connectors 208 may extend substantially perpendicularly from the plane of the circuit board 306 and face the back side 106 of the housing 101.

The plurality of externally accessible connector 208 may comprise at least a first set of connectors 202 and a second set of connectors 206. The first set of connectors 202 may be arranged into a first pattern 222. The second set of connectors 206 may be arranged into a second pattern 220. The first pattern 222 may be a trademark logo, such as ThinkPad™, for example. The second pattern 220 may be a different trademark logo, such as Lenovo™, for example.

In one exemplary embodiment, the plurality of externally accessible connectors 208 may be configured to releasably couple to the power supply connecting terminal 107 and the data communicating terminal 109 of the cradle 102. In another exemplary embodiment, a selected set of connectors 208 may be used as a power line; another selected set of connectors 208 may be used as a data line. In other words, the power line and the data line may be mixed together in a single pattern, such as the first pattern 222, described above.

As shown in FIG. 3B, the plurality of externally accessible connectors 208, such as metal plates, for example, may be connected with connecting wire, such as copper wire 304, for example. There may be a support plate 308 under the flexible printed circuit board 306 to support the externally accessible connectors 208 and the flexible printed circuit board 306.

It should be understood, of course, that the foregoing relate to exemplary embodiments of the invention and that modifications may be made without departing from the spirit and scope of the invention as set forth in the following claims.

We claim:

1. A connector system, comprising:
an electronic computing device having a housing having a front side and a back side;
a circuit board mounted within the housing; and
a plurality of externally accessible connectors mounted on the circuit board within the housing, so that the plurality of externally accessible connectors extend from a plane of the circuit board and face the back side of the housing, wherein the plurality of externally accessible connectors are arranged into at least one pattern comprising a logo, wherein the plurality of externally accessible connectors comprise a substantially flat metal plate, and wherein the plurality of externally accessible connectors comprise at least a first set of externally accessible connectors.

2. The connector system of claim 1, wherein the plurality of externally accessible connectors are separated by insulated materials.

3. The connector system of claim 2, wherein the insulated materials form a plurality of channels.

4. The connector system of claim 1, wherein the plurality of externally accessible connectors include a second set of externally accessible connectors.

5. The connector system of claim 4, wherein the first set of externally accessible connectors are arranged into a first pattern and the second set of externally accessible connectors are arranged in a second pattern.

6. The connector system of claim 1, wherein the circuit board comprises a flexible printed circuit board.

7. The connector system of claim 1, wherein the second pattern comprises a second logo.

8. The connector system of claim 1, wherein the plurality of externally accessible connectors are configured to releasably couple to a power supply and a data communicator.

9. The connector system of claim 1, wherein the front side of the housing is adapted to receive a display screen.

10. A computer tablet apparatus comprising:
a plurality of connectors disposed at an exterior surface of a housing of the computer tablet apparatus, the plurality of connectors being substantially flat including at least a first set of connectors disposed at a first place of the external surface of the housing, and a second set of connectors disposed at a second place away from the first place of the external surface of the housing, wherein the plurality of connectors are arranged into a product logo,
wherein the plurality of connectors are externally accessible, and
wherein the first set of connectors are arranged into a first pattern, and the second set of connectors are arranged into a second pattern.

11. The electronic computing apparatus of claim 10, further comprising a first circuit board, wherein the first set of connectors are mounted on the first circuit board directly.

12. A mobile computing device, comprising:
a housing having a front side and a back side, wherein the front side is adapted to receive a display screen; and
a plurality of externally accessible connectors mounted on the back side of the housing, wherein the plurality of externally accessible connectors are arranged into a plurality of patterns, wherein at least one of the plurality of patterns comprise a logo, wherein the plurality of externally accessible connectors are adapted to transfer power, wherein the plurality of externally accessible connectors include at least a first set of externally accessible connectors.

13. The mobile computing device of claim 12, wherein the plurality of externally accessible connectors include a second set of externally accessible connectors.

14. The mobile computing device of claim 13, wherein the first set of externally accessible connectors are connected to a first circuit board.

\* \* \* \* \*